United States Patent
Huber et al.

(10) Patent No.: US 10,830,953 B2
(45) Date of Patent: Nov. 10, 2020

(54) APPARATUSES FOR COUPLING RADIATION OUT OF AN OPTICAL FIBER

(71) Applicant: TRUMPF LASER GMBH, Schramberg (DE)

(72) Inventors: Rudolf Huber, Aldingen-Aixheim (DE); Stefan Fuchs, Boehringen (DE); Marius Hezel, Boesingen (DE); Julian Hellstern, Horb (DE); Dominik Maier, Boesingen (DE)

(73) Assignee: TRUMPF LASER GMBH, Schramberg (DE)

( * ) Notice: Subject to any disclaimer, the term of this patent is extended or adjusted under 35 U.S.C. 154(b) by 0 days.

(21) Appl. No.: 16/720,270

(22) Filed: Dec. 19, 2019

(65) Prior Publication Data
US 2020/0124806 A1  Apr. 23, 2020

Related U.S. Application Data

(63) Continuation of application No. PCT/EP2018/064593, filed on Jun. 4, 2018.

(30) Foreign Application Priority Data

Jun. 21, 2017 (DE) .................. 10 2017 210 350

(51) Int. Cl.
 *G02B 6/26* (2006.01)
 *G02B 5/00* (2006.01)
 (Continued)

(52) U.S. Cl.
 CPC ............ *G02B 6/262* (2013.01); *G02B 5/005* (2013.01); *G02B 6/243* (2013.01); *G02B 6/4203* (2013.01); *G02B 27/0988* (2013.01); *G02B 5/003* (2013.01)

(58) Field of Classification Search
None
See application file for complete search history.

(56) References Cited

U.S. PATENT DOCUMENTS

| 5,408,553 A * | 4/1995 | English, Jr. .......... G02B 27/106 359/636 |
| 6,178,045 B1 * | 1/2001 | Cook ................. G02B 6/02133 359/559 |

(Continued)

FOREIGN PATENT DOCUMENTS

| DE | 10033785 A1 | 1/2002 |
| DE | 10033786 A1 | 1/2002 |

(Continued)

OTHER PUBLICATIONS

PCT International Preliminary Report on Patentability in International Appln. No. PCT/EP2018/064593, dated Dec. 24, 2019, 8 pages.

(Continued)

*Primary Examiner* — Michael Stahl
(74) *Attorney, Agent, or Firm* — Fish & Richardson P.C.

(57) ABSTRACT

An apparatus for coupling out radiation from an optical fiber, includes a housing, and a stop having a stop opening for delimiting an output coupling angle of radiation that is coupled out of an output end of the optical fiber to a maximum output coupling angle with respect to a central axis of the stop opening, wherein the stop is arranged in the housing. The stop has a stop body made from a transparent material, the stop body has a first total internal reflection face for reflecting radiation that is coupled out of the output end of the optical fiber with greater output coupling angles than the maximum output coupling angle, and the stop body has a second total internal reflection face for reflecting (Continued)

radiation that propagates opposite to the radiation coupled out of the output end and is reflected back by a workpiece.

20 Claims, 3 Drawing Sheets

(51) Int. Cl.
  *G02B 6/24* (2006.01)
  *G02B 6/42* (2006.01)
  *G02B 27/09* (2006.01)

(56) References Cited

U.S. PATENT DOCUMENTS

| | | |
|---|---|---|
| 6,816,237 B2 | 11/2004 | Ueyama |
| 7,085,076 B2 * | 8/2006 | Sallander ............... G02B 5/003 359/738 |
| 8,724,945 B2 | 5/2014 | Gapontsev et al. |

FOREIGN PATENT DOCUMENTS

| | | |
|---|---|---|
| DE | 10033785 C2 | 7/2002 |
| DE | 102008055746 A1 | 5/2010 |
| EP | 1258743 A2 | 11/2002 |
| WO | WO 2018/234024 A1 | 12/2018 |

OTHER PUBLICATIONS

PCT International Search Report and Written Opinion in International Appln. No. PCT/EP2018/064593, dated Aug. 31, 2018, 21 pages (with English translation).

* cited by examiner

APPARATUSES FOR COUPLING RADIATION OUT OF AN OPTICAL FIBER

CROSS REFERENCE TO RELATED APPLICATIONS

This application is a continuation of and claims priority under 35 U.S.C. § 120 from PCT Application No. PCT/EP2018/064593 filed on Jun. 4, 2018, which claims priority from German Application No. DE 10 2017 210 350.7, filed on Jun. 21, 2017. The entire contents of each of these priority applications are incorporated herein by reference.

TECHNICAL FIELD

The disclosure relates to apparatuses for coupling radiation, e.g., laser radiation, out of an optical fiber. The disclosure also relates to fiber-optic cables and to processing heads having such apparatuses.

BACKGROUND

Radiation, e.g., laser radiation, typically exits divergently from the end of an optical fiber. To delimit the divergence or the output-coupling angle of the radiation that is coupled out of the end of the optical fiber, a stop may be used. If the radiation that is coupled out of the optical fiber encounters an obstacle, such as a workpiece that is to be processed, and is reflected back to the stop, it is generally not easily possible to absorb or divert the entire radiation that is reflected back within a region of the housing that is provided for this purpose. Therefore, the radiation that is reflected back can bring about heating and possibly cause damage to the housing surrounding the output coupling end of the optical fiber or the stop or to components that are in the housing. If a stop made from a metallic material is used, it may additionally be the case that undesirable reflections occur at the stop, which likewise heat the surrounding housing and do not permit exact cropping of the beam profile and thus exact delimitation of the coupled-out laser radiation to a maximum output coupling angle.

DE 100 33 785 A1 discloses an apparatus for coupling laser beams into an optical fiber, in which a stop made of a prism body is provided upstream of the input coupling end of the optical fiber. The prism body has a first surface, starting from which a cutout is provided in the prism body, and a second surface on the side opposite the first surface. The cutout tapers from the first surface in the direction of the second surface in a manner such that laser radiation incident on the second surface substantially perpendicularly and penetrates into the prism body undergoes total internal reflection at the interface between the prism body and the cutout. An opening for the passage of the laser radiation that is to be coupled in is provided between the cutout and the second surface, and the optical fiber is in the cutout in the region of the opening.

SUMMARY

In a first aspect, the disclosure features apparatuses including a housing and a stop that has a stop opening for delimiting an output coupling angle of radiation, which is coupled out of an output coupling end of the optical fiber, to a maximum output coupling angle relative to a central axis of the stop opening, wherein the stop is in the housing, wherein the stop has a stop body made from a material that is transparent for the radiation guided in the optical fiber, wherein the stop body has a first total internal reflection face for reflecting radiation that is coupled out of the output coupling end of the optical fiber with greater output coupling angles than the maximum output coupling angle, and wherein the stop body has a second total internal reflection face for reflecting radiation that propagates in the opposite direction of the radiation coupled out of the output coupling end and is reflected back by a workpiece or another obstacle.

The apparatuses described herein are also suitable for coupling radiation into the end of the optical fiber (e.g., input coupling). The radiation that is coupled out of the end of the optical fiber is in this case radiation that is undesirably propagating counter to the input coupling direction, and the divergence of which, like the divergence of the coupled-in radiation, is delimited by the stop.

The stop is made from a transparent material. The deflection of the radiation and thus the stop effect are brought about by way of total internal reflection at a respective total internal reflection face of the stop body. To bring about total internal reflection, it is necessary for the radiation, upon incidence on the total internal reflection face, which forms an interface of the stop body with the environment, to exceed the limit angle of total internal reflection (critical angle $\theta_C$). The critical angle is defined by $\theta_C = \sin^{-1}(n_L/n_B)$, where $n_B$ denotes the refractive index of the (optically more dense) material of the stop body, and $n_L$ denotes the refractive index of the (optically less dense) material surrounding the stop body (typically air at $n_L=1.0$). The maximum (desired) output coupling angle $\alpha_M$ for the radiation that is coupled out of the end of the optical fiber is obtained from the distance A between the position of the output coupling end of the optical fiber and half the diameter d/2 of the stop opening with $\alpha_M = \tan(d/(2A))$. For a given maximum output coupling angle $\alpha_M$, the—possibly location-dependently varying—angle at which the first or the second total internal reflection face is oriented with respect to a plane perpendicular to the central axis of the stop opening can be specified such that for output coupling angles that are greater than the maximum output coupling angle $\alpha_M$, the total internal reflection condition is satisfied at the first total internal reflection face.

Accordingly, the second total internal reflection face can also be designed such that radiation that is incident on the opposite side of the stop propagates in the opposite direction and would enter the optical fiber at input coupling angles that are greater than an input coupling angle that corresponds to the maximum output coupling angle. The radiation is reflected at the second total internal reflection face, with the result that this portion of the back-reflected radiation cannot enter the optical fiber. In the case of the reflection of the radiation at an obstacle, for example a workpiece, however, the problem may arise that the back-reflected radiation has a lateral offset, which means that, despite the stop, it may not be possible to prevent a small portion of the back-reflected radiation from entering the fiber. The function of the stop in both directions is, however, identical in principle.

The stop has a double function, because it not only delimits the output coupling angle and thus the numerical aperture of the coupled-out radiation, but it also largely prevents back-reflected radiation from being coupled back into the optical fiber. Since a stop body made from a transparent material is used in place of a traditional stop body made from a metallic material, it is additionally possible to reduce undesired reflections because the radiation is diverted in a targeted fashion at the precisely manufactured total internal reflection faces outside to the surrounding housing or to absorbers that are provided there. The stop body can be made from a high-power-appropriate material, such as quartz glass, which exhibits only a comparatively low absorption for the radiation that is passing through, even in the case of a high radiant power or radiation intensity.

In some embodiments, the first total internal reflection face of the stop body forms a beam entry face for the radiation that propagates in the opposite direction, and the second total internal reflection face of the stop body forms a beam entry face for the radiation that is coupled out of the optical fiber. The angle at which the radiation is incident on the respective total internal reflection face acting as a beam entry face is selected such that the radiation, upon entry into the stop body, is only slightly diffracted and is incident on the other total internal reflection face. In this way, the two total internal reflection faces of the stop body fulfill a double function, because they are used in one direction for the entry of the radiation into the stop body and, in the other direction, as total internal reflection faces.

In some embodiments, the first total internal reflection face and the second total internal reflection face adjoin one another at a tip of the stop body that delimits the stop opening. In contrast to a stop made from a metallic material, it is possible in the case of the transparent stop described here, owing to the comparatively low absorption in the material of the stop body, for the stop edge to have a very acute taper in the region of the stop opening. It is possible to dispense with a cylindrical stop portion, as is described for example in DE 100 33 785 A1. The point may have a (small) rounding, having a radius of less than approximately 0.3 mm. The angle enclosed by the two total internal reflection faces in the region of the point of the stop body can be for example approximately 80° or less. Undesired reflections, as occur, for example, in the case of metal stops, can be avoided, inter alia, owing to the tip in the region of the stop opening. In the case of a metallic stop, by contrast, a very pointed stop edge could be damaged due to the high absorption of the stop material.

In some embodiments, the first total internal reflection face is upstream of the second total internal reflection face in the propagation direction of the radiation that is coupled out of the optical fiber. In the present embodiment, the beam path of the radiation that is coupled out of the output coupling end of the optical fiber typically does not intersect in the stop body with the beam path of the radiation propagating in the opposite direction. With the first face upstream of the second, there exist more degrees of freedom when selecting the angles that the beam entry faces have with a plane that is perpendicular to the central axis of the stop, because the beam entry faces do not at the same time act as total internal reflection faces. However, it may be possible that a portion of the back-reflected radiation which would be shaded by the stop body in the case of the above embodiment is not shaded by the stop body.

In some embodiments, the stop body has a first beam entry face located opposite the first total internal reflection face for entry of the radiation that is coupled out of the output coupling end of the optical fiber into the stop body, and a second beam entry face that is located opposite the second total internal reflection face for entry of the radiation that propagates in the opposite direction into the stop body, wherein the first beam entry face and/or the second beam entry face can extend in a plane perpendicular to the central axis of the stop opening. The two beam entry faces may also be inclined at an angle that is not too large with respect to the plane perpendicular to the central axis. However, it should be ensured that the incident radiation is only slightly refracted at the respective beam entry face before it is incident on the respective total internal reflection face and is reflected thereby.

In some embodiments, the first total internal reflection face and the first beam entry face adjoin one another at a first tip of the stop body, and the second total internal reflection face and the second beam entry face adjoin one another at a second tip of the stop body. It is possible in the case of the transparent stop to provide one, or in the present case to provide two stop edges with a corresponding tip, at which the total internal reflection face and a respective beam entry face adjoin one another. The tip can have a rounding having a radius of less than 0.3 mm. A respectively different diameter of the stop opening is typically delimited by the two tips (extending in the circumferential direction), the diameter being adapted to the respective distance from the exit-side end of the optical fiber such that the coupled-out radiation is delimited for both diameters in each case to the same maximum output coupling angle.

In some embodiments, the stop body has a first stop component having the first total internal reflection face and a second stop component having the second total internal reflection face, wherein the two stop components can adjoin one another. The first stop component can in this case serve for shading the radiation exiting from the output coupling end of the optical fiber, while the second stop component serves for shading the radiation that propagates in the opposite direction and is, for example, reflected at a workpiece. The two stop components may be at a distance from one another, although it has proven advantageous if both stop components of the stop body rest against one another to optimize the stop effect in the opposite direction and to ensure that only little scattered light is incident on the second stop component and is transmitted by the second stop component as scattered light to the housing.

In some embodiments, the stop body is embodied in one piece. This is advantageous because in an embodiment of the stop body in two or more pieces in this case additional interfaces would be created in the beam path between the beam entry face and the total internal reflection face, which could result in undesirable reflections upon passage of the radiation.

In some embodiments, the first and/or the second total internal reflection face extend rotation-symmetrically with respect to the central axis of the stop opening. In this case, typically the entire stop body has a rotation-symmetric design relative to the central axis. Due to the rotation-symmetric design, the manufacture of the stop body and the adjustment of the stop are simplified.

In some embodiments, the first and/or the second total internal reflection face(s) form(s) a conical face. The use of total internal reflection faces in the form of conical faces has proven to be particularly advantageous. If the total internal reflection faces at the same time form the beam entry faces, the stop body is typically designed in the form of a double cone, in which the conical faces are on sides of the stop body that face away from one another. If the first total internal reflection face is upstream of the second total internal reflection face in the beam path of the coupled-out radiation, the two conical faces face one another. In both cases, the total internal reflection faces may deviate from a conical shape and have a slight curvature.

In some embodiments, a first angle that the first total internal reflection face has relative to a plane perpendicular to the central axis of the stop opening is between 10° and 40°. The values for the first angle at which the first total internal reflection face is oriented relative to the plane perpendicular to the central axis are specified by the observation of the total internal reflection condition. The above value range for the first angle applies to embodiments where the total internal reflection faces at the same time form the beam entry faces, wherein quartz glass is used as the material for the stop body.

In some embodiments, a second angle that the second total internal reflection face has relative to a plane perpendicular to the central axis of the stop opening is between 20° and 60°, or can be between 10° and 45°. The values for the second angle also to the embodiment described further above, in which the beam entry faces of the stop body at the same time form the total internal reflection faces, for example if quartz glass is used as the material for the stop body.

In some embodiments, the maximum output coupling angle is less than 20°, e.g., less than 10°. The maximum output coupling angle that is specified by the stop determines the numerical aperture (NA) of the radiation exiting from the output coupling end of the optical fiber. In air, NA=sin ($\alpha_M$). The delimitation of the numerical aperture or the specification of the maximum output coupling angle to a small value (for example approximately 0.125 rad) makes it possible to prevent the heating of the entire housing owing to the radiation that is coupled out of the output coupling end of the optical fiber.

In some embodiments, the stop body has at least one beam exit face, located radially outwardly with respect to the central axis of the stop opening, for the exit of radiation that is reflected at the first and/or at the second total internal reflection face from the stop body. The beam exit face typically forms a stop periphery that extends in the circumferential direction and is substantially parallel to the central axis. The beam exit face can form a lateral face of a cylinder.

In some embodiments, the beam exit face is at least partially surrounded by an absorber that is mounted in the housing. The absorber can for example surround the beam exit face in the shape of a ring and be embodied in the manner of a sleeve or the like. Using the total internal reflection faces, the radiation is directed in a targeted fashion onto the absorber and converted here to heat. The absorber can to this end be a highly absorptive material for the radiation exiting from the stop body. The radiation exiting from the beam exit face may possibly not be absorbed at an absorber located in the housing but be diverted out of the housing in a different way, for example by virtue of the fact that the radiation exiting from the beam exit face is emitted into the environment at a transparent housing part.

The beam exit face can have a scattering effect on the radiation exiting through the beam exit face. To produce the scattering effect, the beam exit face can be roughened, or scattering centers can be on the beam exit face or in a volume region of the stop body that immediately adjoins the beam exit face. If the beam exit face is embodied in the form of a scattering face, the power of the exiting radiation can be distributed over a larger solid angle range and in this way be absorbed more easily by the surrounding absorber.

In another aspect, the disclosure features fiber-optic cables that include an apparatus as described herein, wherein the housing of the apparatus forms a connector housing of the fiber-optic cable in which the output coupling end of the optical fiber is at a specified distance from the stop. The connector of the fiber-optic cable can be plugged into a connector holder of an optical unit, for example of a processing optical unit. The output coupling angle of the radiation exiting from the fiber-optic cable is delimited using the stop, which is advantageous for example for subsequent collimation of the radiation in the optical unit, for example in a processing head, because heating of the housing of the processing head due to radiation entering therein at an opening angle that is too large can be avoided or reduced.

In a further aspect, the disclosure features processing heads for processing workpieces, in which the housing of the apparatus in which the stop is arranged forms a processing head housing having a connector holder for holding a connector of a fiber-optic cable, wherein the connector holder is embodied for keeping the output coupling end of the optical fiber at a specified distance from the stop. In the case of the processing head, the connector holder specifies the position of the output coupling end of the optical fiber and thus the distance between the output coupling end and the stop in the propagation direction of the laser radiation or in the direction of the central axis of the stop, even if the connector has not yet been inserted in the connector holder.

During processing of the workpiece using the radiation, e.g., laser radiation, that has been coupled out of the output coupling end, the radiation is typically focused onto the workpiece. A portion of the radiation that is incident on the workpiece can be reflected back by the workpiece to the processing head. Welding of a workpiece or of two workpiece parts that are to be joined together along a fillet weld has proven a particular problem with respect to the back-reflections. In the case of this type of processing, the radiation can be reflected back in the direction of the processing head laterally offset with respect to the optical axis. The undesired entry of the back-reflected radiation into the optical fiber can be largely avoided using the stop described herein even in this difficult case.

Further advantages of the invention are evident from the description and the drawings. The aforementioned features and the features that will be mentioned below can likewise be used by themselves or in any desired combinations. The embodiments illustrated and described should not be understood to be an exhaustive list, but rather have an exemplary character for the explanation of the invention.

DETAILED DESCRIPTION

Figure 1A:
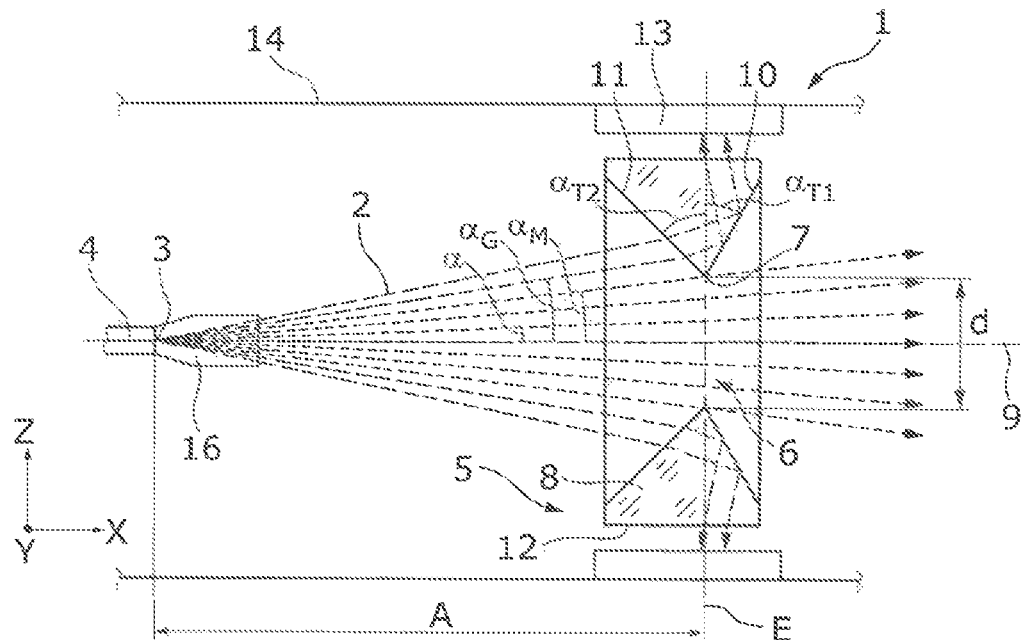
FIGS. 1A and 1B show schematic sectional illustrations of an optical fiber and stop made from a transparent material for shading laser radiation coupled out of the optical fiber and laser radiation propagating in the opposite direction through reflection of the laser radiation at two total internal reflection faces.
Figure 1B:
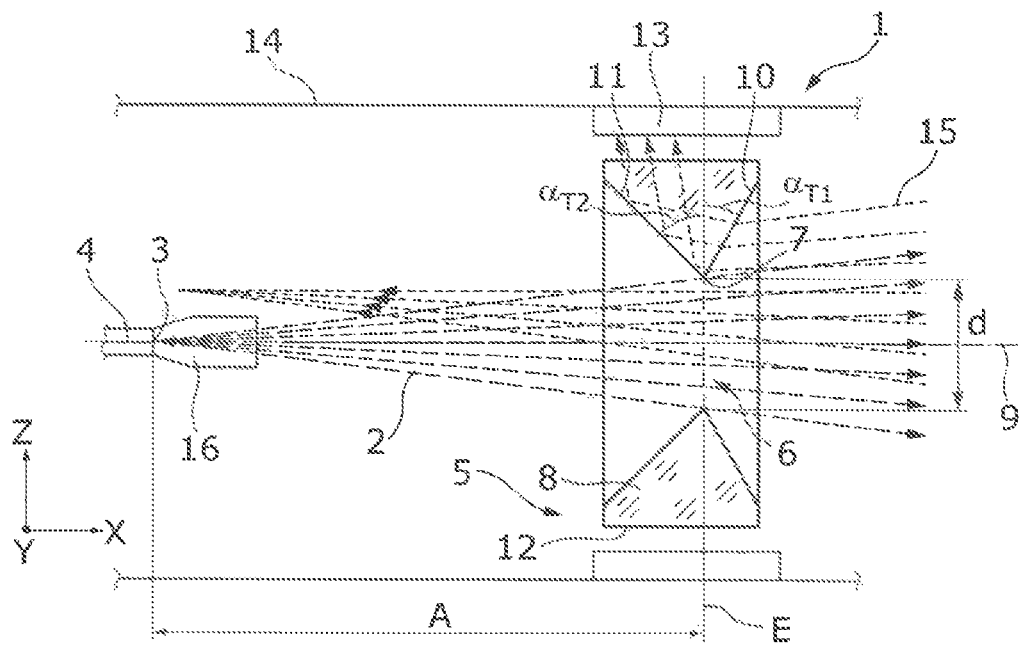

FIGS. 1A and 1B show an exemplary setup of an apparatus 1 for coupling out laser radiation 2 from an output coupling (front) end 3 of an optical fiber 4. The apparatus 1 shown in FIGS. 1A and 1B has a stop 5 for delimiting the output coupling angle α of the divergent laser radiation 2 that is coupled out of or exits the end 3 of the optical fiber 4 to a specified maximum output coupling angle $\alpha_M$. The stop 5 has a stop opening 6 that defines the minimum diameter d of the stop 5, is at a specified distance A from the end 3. The distance A and the diameter d of the stop opening 6 define, in accordance with the equation $\alpha_M$=tan (d/(2 A)), the maximum output coupling angle $\alpha_M$ at which the laser radiation 2 can pass through the stop opening 6 of the stop 5. For the applications described herein, a maximum output coupling angle $\alpha_M$ of less than approximately 20° has proven advantageous.

The stop 5 shown in FIGS. 1A and 1B has a stop body 8 that is configured to be rotation-symmetric with respect to a central axis 9 of the stop opening 6. The stop body 8 is a material that is transparent to the laser radiation 2. The transparent material can be, for example, quartz glass. This material has the advantage that it exhibits low absorption for the laser radiation 2, which can have for example a wavelength in the IR wavelength range of approximately 1.0 μm or in the visible wavelength range, and a high resistance even in the case of high laser outputs. In the case of other wavelengths of the laser radiation 2 the stop body 8 can also be made from transparent materials other than quartz glass.

The stop body 8 of the stop 5 in FIGS. 1A and 1B has two total internal reflection faces 10, 11 that extend rotation-symmetrically with respect to the central axis 9 and are conical faces. The stop body 8 is made in one piece. The two total internal reflection faces 10, 11 are on sides of the stop body 5 that face away from one another. The stop body 8 is a (rotation-symmetric) double cone. The two total internal reflection faces 10, 11 meet at a tip 7 that extends in a ring and delimits the stop opening 6.

The first total internal reflection face 10 prevents laser radiation 2 exiting the output coupling end 3 from the optical fiber 4 at greater output coupling angles $\alpha_G$ than the maximum output coupling angle $\alpha_M$ from passing through the stop 5. The first total internal reflection face 10 is arranged downstream of the second total internal reflection face 11 in the propagation direction X of the coupled-out laser radiation 2. The laser radiation 2, which is coupled out of the output coupling end 3 of the optical fiber 2 at greater output coupling angles $\alpha_G$ than the maximum output coupling angle $\alpha_M$, enters the stop body 8 through the second total internal reflection face 11 and, in this embodiment, is slightly refracted toward the normal direction (FIG. 1A). The second total internal reflection face 11 thus is a beam entry face for the laser radiation 2 that is coupled out of the optical fiber 4 with a greater angle than the maximum output coupling angle $\alpha_M$.

The laser radiation 2 reflected at the first total internal reflection face 10 exits the stop body 8 at a circumferential, cylindrical beam exit face 12 that is located radially outside the central axis 9. The beam exit face 12 forms the circumferential outer periphery of the stop 5, which extends parallel to the central axis 9. The laser radiation 2 exiting the stop body 8 through the beam exit face 12 extends substantially perpendicular to the central axis 9 and can therefore be absorbed by an absorber 13 that surrounds the stop 5 in the region of the beam exit face 12 in the shape of a ring and is fastened to a housing 14 of the apparatus 1. The laser radiation 2 shaded by the stop 5 thus can be directed in a targeted fashion through the beam exit face 12 into the region of the absorber 13 and be absorbed thereby. The beam exit face 12 can form a scattering face for the laser radiation 2 that is deflected at the first total internal reflection face 10, with the result that it can be absorbed better by the absorber 13. To function as a scattering face, the beam exit face 12 can be roughened, or scattering centers can be embedded therein or into the underlying volume of the stop body 8.

As is shown in FIG. 1B, the stop 5 also protects the optical fiber 4 from the entry into the output coupling end 3 of laser radiation 15 that propagates in the direction opposite to the laser radiation 2 that exits from the output coupling end 3. In the case of the laser radiation 15 which propagates substantially along the negative X-direction of an XYZ coordinate system, this can be a portion of the laser radiation 15 that is coupled out of the end 3 of the optical fiber 4 and is reflected back at an obstacle, such as a workpiece.

A frustoconical termination block 16 made from quartz glass is spliced to the end 3 of the optical fiber 4 from which the laser radiation 2 is coupled out. The entry of back-reflected laser radiation 15 into the optical fiber 4 is not prevented by the termination block 16, but by the fact that the back-reflected laser radiation 15 is reflected at the second total internal reflection face 11 of the stop body 8 in the direction of the beam exit face 12 and is absorbed by the absorber 13 (as shown in FIG. 1B). It is possible to additionally configure the termination block 16 with a comparatively large opening angle.

The laser radiation 15 that is reflected back by an obstacle such as, for example, a workpiece, in the example shown travels convergently towards the side of the stop 5 that faces away from the optical fiber 4 (i.e., the rear side of the stop). In FIG. 1B, the back-reflected laser radiation 15 has a slight lateral offset with respect to the laser radiation 2 that is coupled out of the output coupling end 3 of the optical fiber 4. A portion of the back-reflected laser radiation 15 enters the stop body 8 at the first total internal reflection face 10, (the beam entry face for the back-reflected laser radiation 15) is slightly refracted thereby, and is incident on the second total internal reflection face 11. At face 11, the back-reflected laser radiation 15 undergoes total internal reflection toward the beam exit face 12, where it exits the stop body 8 and is incident on the absorber 13.

The stop 5 is adapted to the maximum output coupling angle $\alpha_M$ such that the total internal reflection condition is met for laser radiation 2 that is incident on the first total internal reflection face 10 with greater output coupling angles $\alpha_G$ than the maximum output coupling angle $\alpha_M$. The total internal reflection condition in the stop 5 shown in FIG. 1A can be approximated by:

$$\sin^{-1}\left(\frac{n_L}{n_B}\right) < \alpha_{T1} + \alpha_{T2} - \sin^{-1}\left(\frac{n_L}{n_B}\sin(\alpha_{T2} - \alpha_G)\right)$$

where $n_L$=1.0 denotes the refractive index of (ambient) air, $n_B$=1.46 denotes the refractive index of the quartz glass material of the stop body 8, $\alpha_{T1}$ denotes a (first) angle that the first total internal reflection face 10 encloses with a plane E (YZ-plane) perpendicular to the central axis 9, and $\alpha_{T2}$ denotes a (second) angle that the second total internal reflection face 11 encloses with the plane E perpendicular to the central axis 9. The first angle $\alpha_{T1}$ can be between approximately 10° and approximately 40°. The second angle $\alpha_{T2}$ can be between approximately 20° and approximately 60°, or between approximately 10° and approximately 45°.

For radiation that is incident on the stop 5 at angles $\alpha_G$ greater than the maximum output coupling angle $\alpha_M$ with respect to the central axis 8 with the opposite propagation direction, accordingly:

$$\sin^{-1}\left(\frac{n_L}{n_B}\right) < \alpha_{T1} + \alpha_{T2} - \sin^{-1}\left(\frac{n_L}{n_B}\sin(\alpha_{T2} - \alpha_G)\right).$$

Figure 2A:
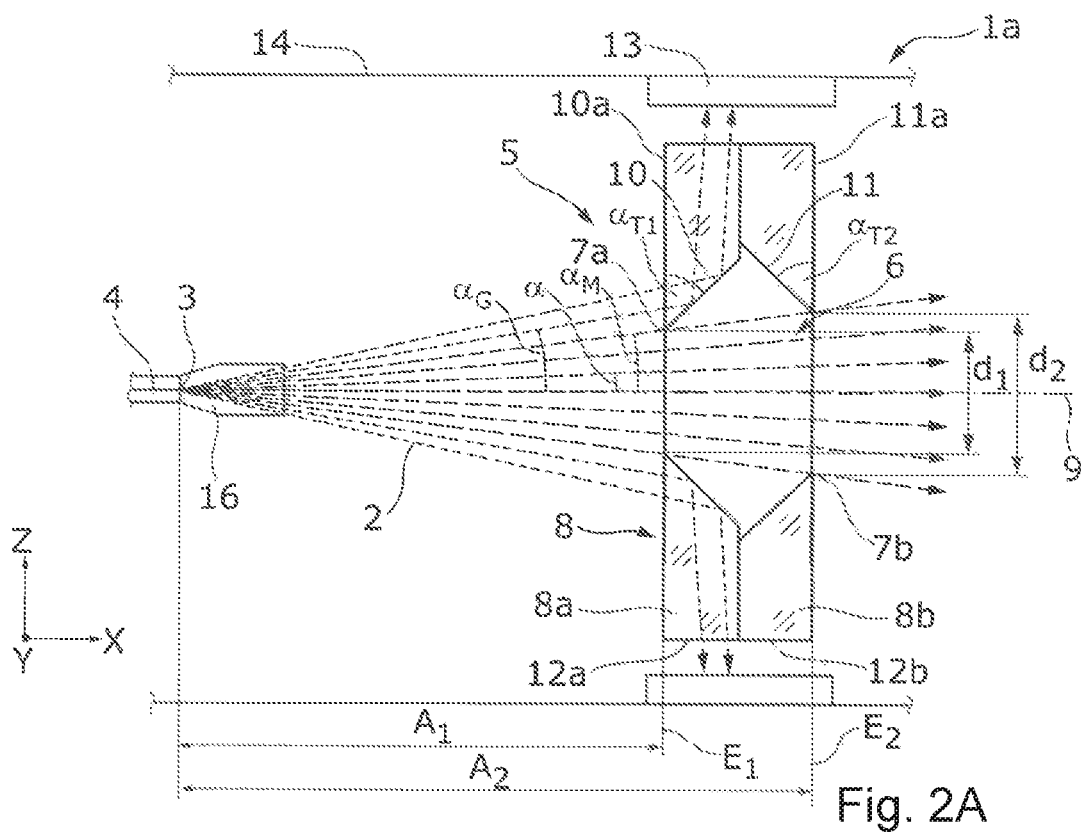
FIGS. 2A and 2B show schematic illustrations similar to FIGS. 1A and 1B, where the two total internal reflection faces of the stop are on mutually facing sides of two stop components.
Figure 2B:
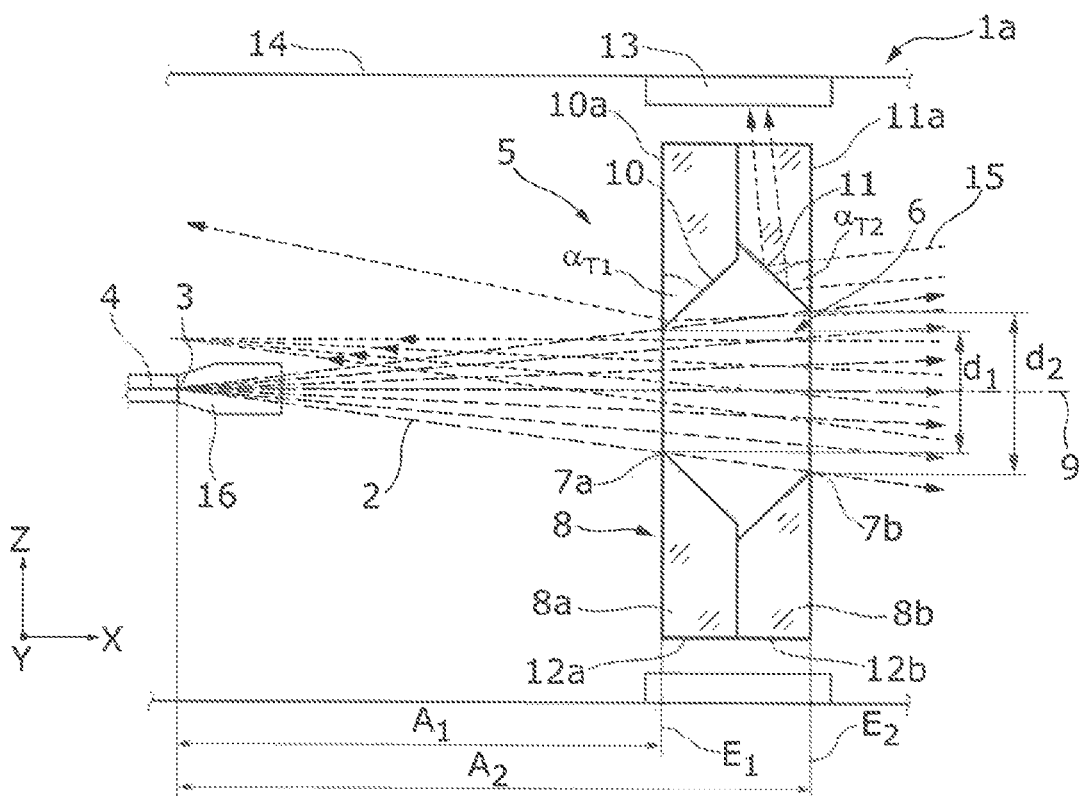

FIGS. 2A and 2B show an alternative apparatus 1a for coupling laser radiation 2 out of an output coupling end 3 of an optical fiber 4. The apparatus 1a of FIGS. 2A and 2B differs from the apparatus 1 of FIGS. 1A and 1B in terms of the configuration of the stop 5, more specifically of the stop body 8a. The stop body 8a has two stop components 8, 8b made from quartz glass, which are each rotation-symmetric with respect to the central axis 9. The two stop components 8a, 8b adjoin one another at two planar faces in a plane perpendicular to the central axis 9 of the stop 5. The two stop components 8a, 8b can be connected to one another at the planar faces, for example by being adhesively bonded to one another. An integral connection between the two stop components 8a, 8b is not absolutely necessary, however. Rather, it is also possible for the two stop components 8a, 8b to be held in a common mount such that they are fixed in that position in which they rest against one another. It is also possible for the two stop components 8a, 8b to be spaced apart from one another.

In FIGS. 2A and 2B, the first total internal reflection face 10 is upstream of the second total internal reflection face 11 in the propagation direction X of the coupled-out laser radiation 2. The laser radiation 2, which exits from the optical fiber 4 at output coupling angles $\alpha_G$ that are greater than the maximum output coupling angle $\alpha_M$, enters the stop body 8 at the first stop component 8a through a first beam entry face 10a. The first beam entry face 10a extends in a plane $E_1$ perpendicular to the central axis 9 of the stop 5. The first total internal reflection face 10 is inclined at an angle $\alpha_{T1}$ with respect to the plane $E_1$ or the first beam entry face 10a. As is illustrated in FIG. 2A, the laser radiation 2 enters the first stop component 8a at output coupling angles $\alpha_G$ greater than the maximum output coupling angle $\alpha_M$ and is reflected at the first total internal reflection face 10 and exits the first stop component 8a through the cylindrical beam exit face 12a and is absorbed by the absorber 13.

The back-reflected laser radiation 15 at the second stop component 8b enters the second stop component 8b at a planar beam entry face 11a extending in a plane $E_2$ relative to the central axis 9 of the stop 5 and is reflected at the second total internal reflection face 11, which is inclined at a (second) angle $\alpha_{T2}$ relative to the beam entry face 11a, toward the radially outer beam exit face 12b of the second stop component 8b and, after exit from the stop body 8, is absorbed by the absorber 13.

The first angle $\alpha_{T1}$, which the first total internal reflection face 10 encloses with the plane $E_1$ perpendicular to the central axis 9, and the second angle $\alpha_{T2}$, which the second total internal reflection face 11 encloses with the plane $E_2$ perpendicular to the central axis 9, lie in the stop 5 shown in FIGS. 2A and 2B approximately in the same order of magnitude as in the stop 5 shown in FIGS. 1A and 1B, e.g., between approximately 20° and approximately 60°.

The first, conical total internal reflection face 10 and the first beam entry face 10a adjoin one another at a first tip 7a of the first stop component 8a, while the second, conical total internal reflection face 11 and the second beam entry face 11a adjoin one another at a second tip 7b of the second stop component 8b. The stop 5 of FIGS. 2A and 2B thus has, like the stop 5 shown in FIGS. 1A and 1B, a double cone design, with the difference that in FIGS. 2A and 2B, the two total internal reflection faces 10, 11 are on two plane-conical stop parts 8a, 8b and face one another, while the two total internal reflection faces 10, 11 in the case of the stop body 8 of FIGS. 1A and 1B face away from one another. The stop 5 shown in FIGS. 2A and 2B does not necessarily have to have two stop components 8a, 8b, but can possibly also be designed in one piece.

The tip 7a of the first stop component 8a delimits a minimum diameter $d_1$ of the stop opening 6 at the first stop component 8a. The tip 7b of the second stop component 8b delimits a minimum diameter $d_2$ of the stop opening 6 at the second stop component 8b. The distance $A_1$ of the first tip 7a of the first stop component 8a from the end 3 of the optical fiber 4 and the distance $A_2$ of the tip 7b of the second stop component 8b from the end 3 of the optical fiber 4 and also the two minimum diameters $d_1$ and $d_2$ of the stop opening 6 at the two tips 7a, 7b are adapted to one another such that the output coupling angles $\alpha$ of the coupled-out laser radiation 2, which passes through the stop 5, are delimited at both tips 7a, 7b to the same maximum output coupling angle $\alpha_M$. This also makes possible a stop effect for the back-reflected laser radiation 15.

The apparatus 1 and 1a shown in FIGS. 1A and 1B and in FIGS. 2A and 2B can be used in different optical units, for example in optical units in which, downstream of the stop 5, the laser radiation 2 that is coupled out of the end 3 of the optical fiber 4 is collimated.

Figure 3A:
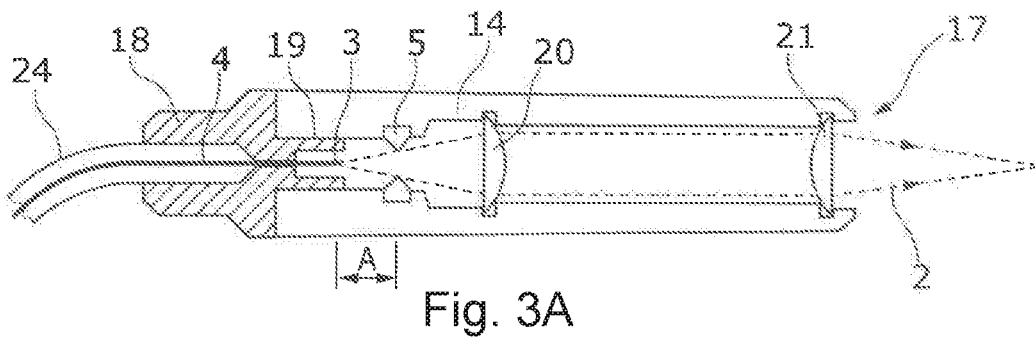
FIG. 3A shows a sectional illustration of a processing head for processing workpieces using the stop of FIGS. 1A and 1B.

FIG. 3A shows a processing head 17 having an apparatus 1 in accordance with FIGS. 1A and 1B. The processing head 17 serves for welding a workpiece 22 shown in FIG. 3B. The housing which serves for holding the stop 5 in this case forms a processing head housing 14 of the (laser) processing head 17.

The processing head housing 14 has a connector holder 19, in which in the case of the processing head 17 shown in FIG. 3A a connector 18 of a fiber-optic cable 24 is held. The fiber-optic cable 24, which has a protective cladding for protecting the optical fiber 4, is connected to a laser source at an entry-side end, which is not depicted in FIG. 3A, for generating the laser radiation 2. The output coupling end 3 of the optical fiber 4 is attached in the connector 18 of the fiber-optic cable 24, which is held in the connector holder 19 of the processing head housing 14 and is thus fixed in terms of its position relative to the processing head housing 14. The connector holder 19 of the processing head housing 14 is thus configured for holding the output coupling end 3 of the optical fiber 4 at a specified distance A from the stop 5 which is mounted in the processing head housing 14.

Laser radiation 2, which is coupled out of the output coupling end 3 of the optical fiber 4 at an angle that is greater than the maximum output coupling angle $\alpha_M$, is shaded by the stop 5 in the case of the processing head 17 shown in FIG. 3A, with the result that no coupled-out laser radiation 2 is incident on the processing head housing 14 outside the absorber 13. The coupled-out laser radiation 2 thus passes through the stop opening 6 at a desired, maximum opening angle or output coupling angle $\alpha_M$ and is incident on a collimation lens 20. The coupled-out laser radiation 2 is collimated at the collimation lens 20 and is subsequently focused by a focusing lens 21 (also in the processing head 17) onto the workpiece 22 shown in FIG. 3B.

Figure 3B:
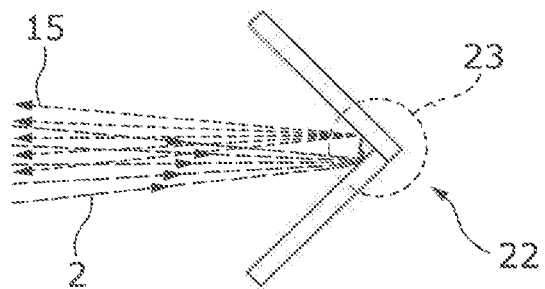
FIG. 3B shows an illustration of a beam path for welding a workpiece using the processing head of FIG. 3A.

In the example shown, two workpiece parts, which abut one another at a right angle at an edge, are welded together along what is known as a fillet weld using the focused laser radiation 2 exiting from the processing head 17. A welding region 23 in the case of laser beam welding of the workpiece 22 is indicated in FIG. 3B by a dashed circle. As is likewise evident in FIG. 3B, a portion of the coupled-out laser radiation 2 is reflected twice at the workpiece 22 in the region of the fillet weld by approximately 90°, with the result that the laser radiation 2 which is incident on the workpiece 22 is deflected in total by approximately 180°. The laser radiation 15 reflected back by the workpiece 22 has a lateral offset with respect to the laser radiation 2 that is incident on the workpiece 22. Upon passing through the processing head 17 in the opposite direction, the back-reflected laser radiation 15 is collimated at the focusing lens 21 and focused at the collimation lens 20, with the result that it is convergently incident with a lateral offset on the rear side of the stop 5, as is indicated in FIG. 1B.

Figure 4:
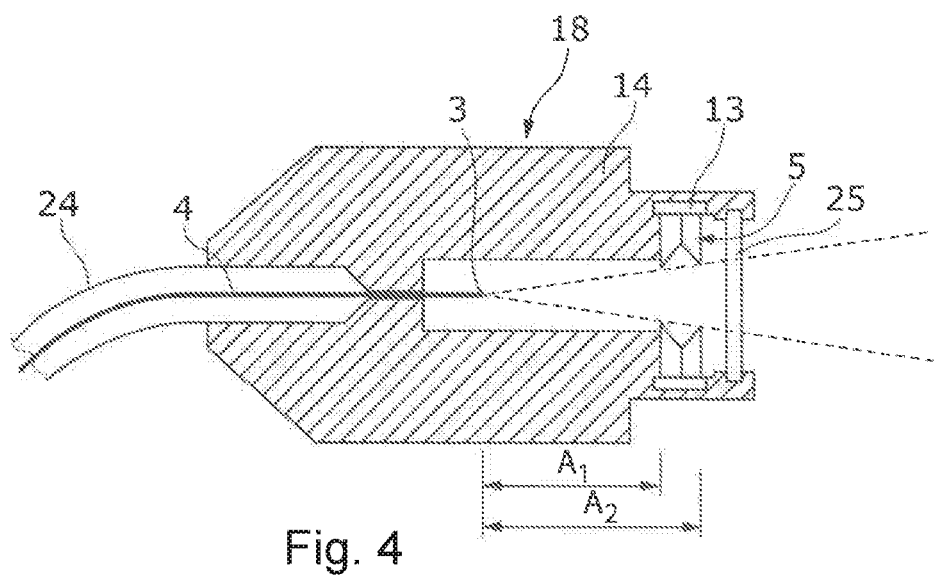
FIG. 4 shows a sectional illustration of a fiber-optic cable having a connector, in which the stop of FIGS. 2A and 2B is mounted.

FIG. 4 shows an example in which the apparatus 1a of FIGS. 2A and 2B is integrated in a fiber-optic cable 24 via a connector 18 of the fiber-optic cable 24 that serves for connecting the fiber-optic cable 24 to a processing head or to a different optical unit. The stop 5 is integrated into the connector 18 or in the connector housing 14, and the exit-side end 3 of the optical fiber 4 is held in the connector housing 14 at a specified distance A1 from the front side and at a specified distance A2 from the rear side of the stop 5. The coupled-out laser radiation 2 exits the connector 18 through an optional planar protective glass 25. The two stop components 8a, 8b for the stop 5 of FIG. 4 can be at a distance from one another.

In summary, in the apparatuses 1, 1a described above, back-reflections, as would occur when using a stop made from a metallic material, can be avoided by using a transparent material for the stop body 8. The stop 5 makes it possible to shade radiation from the two propagation directions, without the need for a plurality of components. In addition, no absorption, or only slight absorption, takes place in the stop body 8 itself, and deformations of and damage to the stop 5 due to heating of the material of the stop body 8 through laser radiation 2, 15 can be avoided. The stop 5 shown in FIGS. 1A and 1B can also be integrated in the processing head 17 shown in FIG. 3A. The stop 5 shown in FIGS. 2A and 2B can also be integrated in the connector 18 of the fiber-optic cable 24 shown in FIG. 4.

Other Embodiments

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus for coupling out radiation exiting an optical fiber, the apparatus comprising:
   a housing; and
   a stop within the housing, the stop comprising:
      a stop opening configured to delimit an output coupling angle of radiation that exits an output end of the optical fiber in a propagation direction to a maximum output coupling angle with respect to a central axis of the stop opening, and
      a stop body made from a transparent material, wherein the stop body comprises a first total internal reflection face configured to reflect radiation that exits the output end of the optical fiber with greater output coupling angles than the maximum output coupling angle, and a second total internal reflection face configured to reflect radiation that propagates opposite to the propagation direction.

2. The apparatus of claim 1, wherein the first total internal reflection face of the stop body forms a beam entry face for the radiation propagating in the opposite direction, and wherein the second total internal reflection face of the stop body forms a beam entry face for the radiation that exits the optical fiber.

3. The apparatus of claim 2, wherein the first total internal reflection face and the second total internal reflection face adjoin one another at a tip of the stop body that delimits the stop opening.

4. The apparatus of claim 1, wherein the first total internal reflection face is upstream of the second total internal reflection face in the propagation direction of the radiation exiting the optical fiber.

5. The apparatus of claim 4, wherein the stop body comprises:
   a first beam entry face, located opposite the first total internal reflection face, for the entry of the radiation from the output end of the optical fiber into the stop body, and
   a second beam entry face opposite the second total internal reflection face for the entry of radiation that propagates in the opposite direction into the stop body,
   wherein one or both of the first beam entry face and the second beam entry face extend in a plane perpendicular to the central axis of the stop opening.

6. The apparatus of claim 5, wherein the first total internal reflection face and the first beam entry face adjoin one another at a first tip of the stop body and the second total internal reflection face and the second beam entry face adjoin one another at a second tip of the stop body.

7. The apparatus of claim 1, wherein the stop body has a first stop component having the first total internal reflection face and a second stop component having the second total internal reflection face, wherein the two stop components adjoin one another.

8. The apparatus of claim 1, wherein the stop body is configured in one piece.

9. The apparatus of claim 1, wherein one or both of the first and the second total internal reflection faces extend rotation-symmetrically with respect to the central axis of the stop opening.

10. The apparatus of claim 9, wherein one or both of the first and the second total internal reflection faces form a conical face.

11. The apparatus of claim 10, wherein the first total internal reflection face has a first angle with respect to a plane perpendicular to the central axis of the stop opening of between 10° and 40°.

12. The apparatus of claim 10, wherein the second total internal reflection face has a second angle with respect to a plane perpendicular to the central axis of the stop opening of between 20° and 60°.

13. The apparatus of claim 1, wherein the maximum output angle is less than 20°.

14. The apparatus of claim 13, wherein the maximum output angle is less than 10°.

15. The apparatus of claim 1, wherein the stop body has at least one beam exit face located radially outside the central axis of the stop opening for the exit from the stop body of radiation reflected at one or both of the first and the second total internal reflection face.

16. The apparatus of claim 15, wherein the beam exit face is at least partially surrounded by an absorber mounted in the housing.

17. The apparatus of claim 15, wherein the beam exit face has a scattering effect on the radiation exiting through the beam exit face.

18. The apparatus of claim 1, wherein the radiation that propagates opposite to the propagation direction results from back reflection by an obstacle.

19. A fiber-optic cable, comprising:
an apparatus for coupling out radiation exiting an optical fiber, the apparatus comprising:
a housing; and
a stop within the housing, the stop comprising:
a stop opening configured to delimit an output coupling angle of radiation that exits an output end of the optical fiber in a propagation direction to a maximum output coupling angle with respect to a central axis of the stop opening, and
a stop body made from a transparent material, wherein the stop body comprises a first total internal reflection face configured to reflect radiation that exits the output end of the optical fiber with greater output coupling angles than the maximum output coupling angle, and a second total internal reflection face configured to reflect radiation that propagates opposite to the propagation direction, wherein the housing forms a connector housing of the fiber-optic cable in which the output end of the optical fiber is at a specified distance from the stop.

20. A processing head for processing workpieces, comprising:
an apparatus for coupling out radiation exiting an optical fiber, the apparatus comprising:
a housing; and
a stop within the housing, the stop comprising:
a stop opening configured to delimit an output coupling angle of radiation that exits an output end of the optical fiber in a propagation direction to a maximum output coupling angle with respect to a central axis of the stop opening, and
a stop body made from a transparent material, wherein the stop body comprises a first total internal reflection face configured to reflect radiation that exits the output end of the optical fiber with greater output coupling angles than the maximum output coupling angle, and a second total internal reflection face configured to reflect radiation that propagates opposite to the propagation direction, wherein the housing forms a processing head housing having a connector holder for holding a connector of a fiber-optic cable, wherein the connector holder is configured for holding the output end of the optical fiber at a specified distance from the stop.

* * * * *